W. McA. JOHNSON.
MINERAL MANURE PROCESS.
APPLICATION FILED JUNE 21, 1918. RENEWED FEB. 6, 1920.
1,338,734.
Patented May 4, 1920.
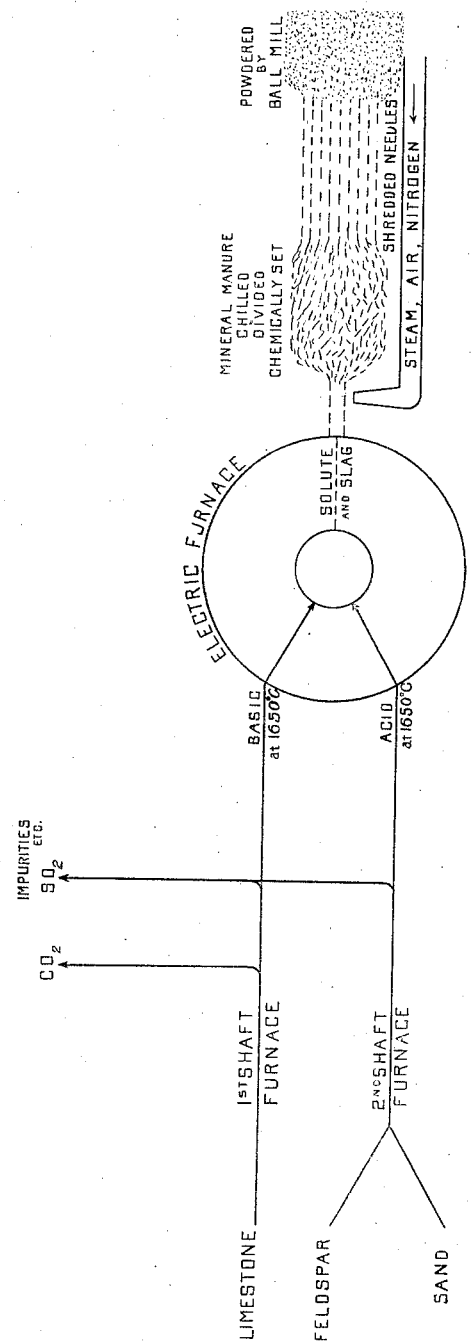

UNITED STATES PATENT OFFICE.

WOOLSEY McA. JOHNSON, OF HARTFORD, CONNECTICUT.

MINERAL-MANURE PROCESS.

1,338,734.  Specification of Letters Patent.  Patented May 4, 1920.

Original application filed February 2, 1915, Serial No. 5,787. Divided and this application filed June 21, 1918, Serial No. 241,155. Renewed February 6, 1920. Serial No. 356,798.

*To all whom it may concern:*

Be it known that I, WOOLSEY McA. JOHNSON, a citizen of the United States, and residing at Hartford, in the county of Hartford and State of Connecticut, have invented a new and Improved Mineral-Manure Process, of which the following specification is a full disclosure.

This application is a division of my co-pending case No. 5787, filed February 2nd, 1915, and the present invention deals with the manufacture of artificial mineral manures from readily available minerals normally unsuitable for use directly as fertilizers although containing the essential ingredients.

It is well known that plants absorb and are dependent upon potassium. The soil is quickly impoverished of this element unless it is replaced in an assimilable form. Certain minerals, notably feldspar, contain great quantities of this element but not in a form easily assimilable by plant life.

The primary purpose of this invention is to render available a commercially suitable process for utilizing feldspar in the production of mineral manures. The process contemplates the formation of a slag by fusing feldspar with lime and other slag making ingredients so as to produce a slag representing by its analysis in conjunction with a given soil the requirements of the plant to be grown.

By analyzing the ash of the plant, it will be found to contain certain elements in definite proportions and, by analyzing the soil, it will be found that various of these elements are either absent, scarce, or in a non-assimilable form.

This invention proposes the production of a mineral manure constituted to supply the deficient elements and it comprehends the utilization of feldspar and lime for the purpose of forming a slag representing by its analysis said ingredients in a readily assimilable condition.

This process may be further exemplified by way of its embodiment and utilization, in connection with sundry specific improvements, for the manufacture of artificial mineral manures. In this embodiment of my invention, a slag incorporating predetermined amounts of fertilizing ingredients is made by separately heating acid and basic minerals in separate shaft furnaces and then, by means of an electric furnace, causing them to react to form a fusible slag by utilizing the principle disclosed in the foregoing. This fertilizing slag is then rendered bio-chemically active by the sudden chilling resulting from the blowing step.

The accompanying drawing depicts this process diagrammatically.

In carrying out this improved embodiment of my invention, the raw materials will be so selected and proportioned as ultimately to yield a more or less inert slag constituting a base or magna and carrying (so loosely that it may be easily absorbed by the soil) a "solute" analyzing either alone or together with the slag approximately the same as does the ash of the crop in prospect. This may be better explained in a given individual example and, for that purpose, let it be assumed that the objective is to produce a mineral fertilizer for stimulating the growth of ash saplings planted for reforesting purposes. The mineral remains of an ash tree analyze about as follows: $K_2O$, 13 parts; $Na_2O$, 2 parts; $MgO$, 6 parts; $Al_2O_3$, 1 part; $CaO$, 78 parts; $P_2O_5$, 5 parts; $SiO$, 2 parts; $Fe_2O_3$, 0.1 part or trace; and therefore the ultimate slag produced by my process will either contain a "solute" of a substantially similar analysis; or it may be constituted so that, together with said "solute," it will contain soil-absorbable constituents of a similar character in similarly available proportion.

This analysis calls for very considerable quantities of potassium and calcium, together with appreciable amounts of magnesium and phosphorus, and this specific invention proposes the selection of raw materials that will provide these elements in sufficient quantities and that will, when they combine chemically, also provide the additional elements essential to the formation of a free-flowing, low-melting slag. Preferably the raw material will be selected and proportioned to yield a bath consisting of about eighty per cent. of a slag of the calcium-sesquisilicate type—$(CaO)_2(SiO_2)_3$—and which will analyze about 4.7 per cent. $K_2O$.

For the purpose of this invention, the mineral (A) feldspar may well be selected as a cheap source of potassium; but, as it is deficient in the needful amount of calcium, some (B) limestone will also be selected;

and, as (A) and (B) are wanting together in sufficient silicon to form a suitable slag, some (C) sand will also be used. Thus, by resorting to three primary raw materials, the components for the ultimate fertilizer are very cheaply obtainable, as will be perceived from the following analysis:

|  | $K_2O$ | CaO | $SiO_2$ | $Al_2O_3$ | MgO | $Fe_2O_3$ | $Na_2O$ |
|---|---|---|---|---|---|---|---|
| (A) Feldspar | 12.9% | 0.2% | 65.0% | 16.9% | 1.0% | | 2.1% |
| (B) Limestone | | 63.0% | 0.9% | 2.0% | 1.0% | | |
| (C) Sand | | 0.6% | 94.0% | 2.0% | | 3.0% | |

These are chosen in such proportions that the "solute" will form about 20% of the whole, and will subsist as a neutral component very much as the salt in sea-water. Those raw materials also taken in such amounts as to yield the ratio of three acid parts (in molecular proportions) against two basic parts (in molecular proportions); said parts together aggregating 80% of the bath.

In this way may be produced the raw materials providing all the constituents necessary for the "solute" and also providing such constituents as will form a slag in the nature of a solvent for the "solute," so that the feldspar may be chemically unlocked, so to speak, to release and render agriculturally available its valuable potassium constituent. While the primary purpose of this invention is to utilize natural minerals in constituting the raw materials, nevertheless, in certain instances artificial products may be utilized to supply many of the needed ingredients. Thus, the "cinder" from an iron blast furnace may be utilized in forming a free running slag of the calcium sesquisilicate type, and this or any other suitable auxiliary raw material may be introduced in a state of actual fusion directly into the electric furnace, when it is more cheaply available in that physical condition.

Having thus determined and selected the raw materials as herein specified, the next step of heat treating the same by the direct application of heat derived from the combustion of fuel will follow. The acid charge is passed through one shaft furnace, and the basic charge is passed through another shaft furnace and, by means of heat applied directly from the flame of fuel combustion, the materials are brought to a very high temperature and by reason of being separated, no incipient slagging can form and, therefore, this operation may be conducted smoothly and expeditiously. During this operation, certain waste gases and deleterious ingredients are eliminated. Thus, any residual sulfur may be driven off as $SO_2$ or $SO_3$, and in this way the ultimate production of $Ca_2S$, which would be harmful, is avoided. In case a molten sulfur-bearing slag is employed as one of the raw materials, it will be desulfurized by blowing air through it while hot.

The various raw materials, having been thus brought to a high temperature, are now introduced into the electric furnace to form a slag-bath containing the "solute," together with certain amounts of calcium carbid and ferro-silicon. The amount of these products will depend upon and may be controlled by the quantity of power available for and accordingly used in the electric furnace.

Having thus manufactured the special slag holding the "solute" in a state of solution, the next step has for its object to convert it into such a form that it may be conveniently transported and applied, as well as readily assimilated by the soil. This step, therefore, involves an operation effective first, to comminute the material and thereby make its handling convenient; second, to so stabilize it that it will preserve its sub-division throughout all normal handling conditions, without caking or setting into a cohesive mass; and third, to bring it into such a physico-chemical state that its useful ingredients may be assimilated by the soil and plants so rapidly as to stimulate the agricultural process without, however, permitting the useful ingredients to waste under the wash of rains.

This sub-division and conditioning step is preferably accomplished by the agency of some inert means for mechanically dashing the still-molten material into a sufficiently minute state of sub-division under proper physical and chemical conditions. Preferably, this is performed by water or an air blast to associate the molten material in the form of so-called "mineral wool." This air may be associated with an excess of nitrogen or with steam, or both, so as not only to physically sub-divide the material but also to effect a sudden chilling thereof and to enable the nitrogen to form certain cyanamid products and the steam to yield such water as may be necessary to at once "set" cementitious qualities by a process of hydration. This hydration may, of course, be effected by another application of water and it has the advantage of not only preventing caking of the mass but it also forms a mild alkaline product that tends to correct the acid of average soils.

The reaction resulting in the formation of the slag continuously evolves gas bubbles which, by uprising through the slag bath, maintain it in a state of uniformity by reason of its highly liquid condition and advantage is taken of its fluid form to effect a high sub-division of its particles without resorting to expensive crushing and grinding operations. That is to say, a jet of air under high pressure is projected against the stream of continuously escaping slag so as to blow or shatter it into "wool" and thus effect a minute sub-division when there is but little cohesive energy to be overcome by reason of the fact that the liquid particles are very mobile and possess no pronounced cohesion. This step has a further advantage that, as a result of the sudden chilling of the particles of cement, the chemical potential of the product against easy assimilation by plant life is rendered less than it is in the case of old-fashioned mineral manures. This is analogous to the chemical operation of rendering slags readily soluble in acids by abruptly chilling the same, and in the case of the present manure, the energy of solidification can be regarded stored up in the powder to become available later as energy of hydration. The air is highly pre-heated by this operation and, to conserve this heat, this air is carried to both of the shaft furnaces and is utilized for raising the flame temperature thereof.

The wool, formed as above described, is now preferably ground and torn into needles, ranging from .001 inch to .1 inch in diameter and from .125 inch to .5 inch long, by passing it through a set of rolls having interlocking and knifelike projections made of manganese steel, somewhat similar to those of a "shoddy" machine. This torn wool is then fed into a dust-proof ball mill, such as of the Hardinge type, and by a continuous operation is ground to 150 mesh or finer. The result is an exceedingly efficient mineral manure.

This air blast step, by abruptly chilling the slag or magna and its "solute" puts the material into a condition such that it may be easily assimilated by the soil or the plant life without, however, rendering it so soluble in water as to wash away. In other words my artificial fertilizer has been made defenseless against the attacks of the acrid fluids of plant life, somewhat as slags are made easily soluble in hydrochloric acid for purposes of chemical analysis by a water-quenching process, so as to avoid the necessity (otherwise obtaining) of fusing the sample with sodium carbonate, etc.

More or less calcium carbid will be formed in the electric furnace and this may be utilized as a cheap source of plant available nitrogen, in consequence of the reaction between the nitrogen in the air and the carbid (which yields calcium cyanamid) during the wooling step. This reaction may be promoted by adding nitrogen gas to the steam blast and by recollecting and utilizing the nitrogen by a suitable inclosed system on a continuous cycle.

Having made the "wool," it may be applied to the soil without further treatment, or it may be still further ground and pulverized, in the manner described in the foregoing.

Practical tests have confirmed the efficacy of this artificial fertilizer in providing the components whereof the plants may build the hard molecular frame-work constituting the desired tough upright vegetable fiber. By my process, the solute is put into the magna along approved metallurgico-commercial lines for any predetermined prospective crop.

Having thus revealed this invention, I claim as new and desire to secure the following combinations of steps, or equivalents thereof, by Letters Patent of the United States:—

1. A fertilizer making process which comprehends forming a slag containing a solute having high potassium content and proportioned to correspond with a predetermined fertilizer composition and then blowing the fluid slag into a fine state of sub-division.

2. A fertilizer making process which comprehends separately forming an acid and a basic mixture by utilizing feldspar and predetermined silicates; separately bringing said mixtures to a high temperature approximating the fusing temperature of the slag formed therefrom, then causing them to come together in an electric furnace; melting the same in said furnace to form a slag and then finally sub-dividing said slag.

3. A continuous process for making mineral manure which comprehends separately heating an acid and a basic mineral to incandescence by heat derived from the combustion of fuel; then introducing said incandescent minerals into an electric furnace and therein further elevating the temperature to cause them to combine to form a slag; then blowing said slag into a wool; and then pulverizing said wool.

4. A continuous process for making mineral manure which comprehends separately raising an acid potassium bearing mineral and a basic mineral to an incandescent temperature; then bringing together in a closed container said incandescent minerals and supplying heat within said container to further elevate the temperature and cause said minerals to react to form a slag; then physically dispersing said molten slag into a state of minute sub-division before permitting it to cool and harden; and then grinding said sub-divided slag into a pulverulent form.

5. A continuous process for making mineral manure which comprehends separately raising an acid potassium bearing mineral and a basic mineral to an incandescent temperature by means of heat derived from the combustion of fuel; then bringing together in a closed container said incandescent minerals and developing heat within said container to further elevate the temperature and cause said minerals to react to form a slag; and then physically dispersing said molten slag into a state of minute sub-division before permitting it to cool and harden.

6. A continuous process for making mineral manure which comprehends separately raising an acid potassium bearing mineral and a basic mineral to an incandescent temperature by means of heat derived from the combustion of fuel; then bringing together in a closed container said incandescent minerals and developing within said container heat from electrical energy to further elevate the temperature and cause said minerals to react to form a slag; then blowing said slag into the form of mineral wool; then shredding said matted wool; and finally pulverizing the product.

7. A continuous process of making mineral manure by separately bringing ingredients thereof to an intense temperature by heating derived from the combustion of fuel; and then feeding said pre-heated ingredients into a fused bath of the manurial compound.

8. A continuous process of making mineral manure by forming a fused bath of the manurial composition; maintaining said bath in a state of fusion by the aid of electrical energy; withdrawing portions of said bath and converting the same into a pulverulent form; and adding highly preheated constituents to said bath whereby they may be caused to react and fuse to replenish the withdrawn portions of said bath.

9. A continuous manure making process of the nature disclosed, involving the preparatory operation of bringing the separated mineral constituents to a dazzling white temperature by heat derived from the combustion of fuel; then causing said preheated ingredients chemically to react under the influence of a further electrically induced temperature rise.

10. A process of making mineral manure adapted for a predetermined plant which consists in selecting such quantities of a given feldspar and lime as will form a slag containing the ingredients of the ash of said plant in approximately the proportions thereof in said ash; then fusing together said feldspar and lime to form a bath of slag; and then sub-dividing the slag when molten and collecting the chilled particles.

In witness whereof I hereunto subscribe my name, as attested by the two subscribing witnesses.

WOOLSEY McA. JOHNSON.

Witnesses:
LILLIAN S. AMBER,
ALBERT F. NATHAN.